Feb. 15, 1927.
L. M. WOOLSON
1,617,471
MOTOR VEHICLE
Filed Aug. 11, 1923    2 Sheets-Sheet 2
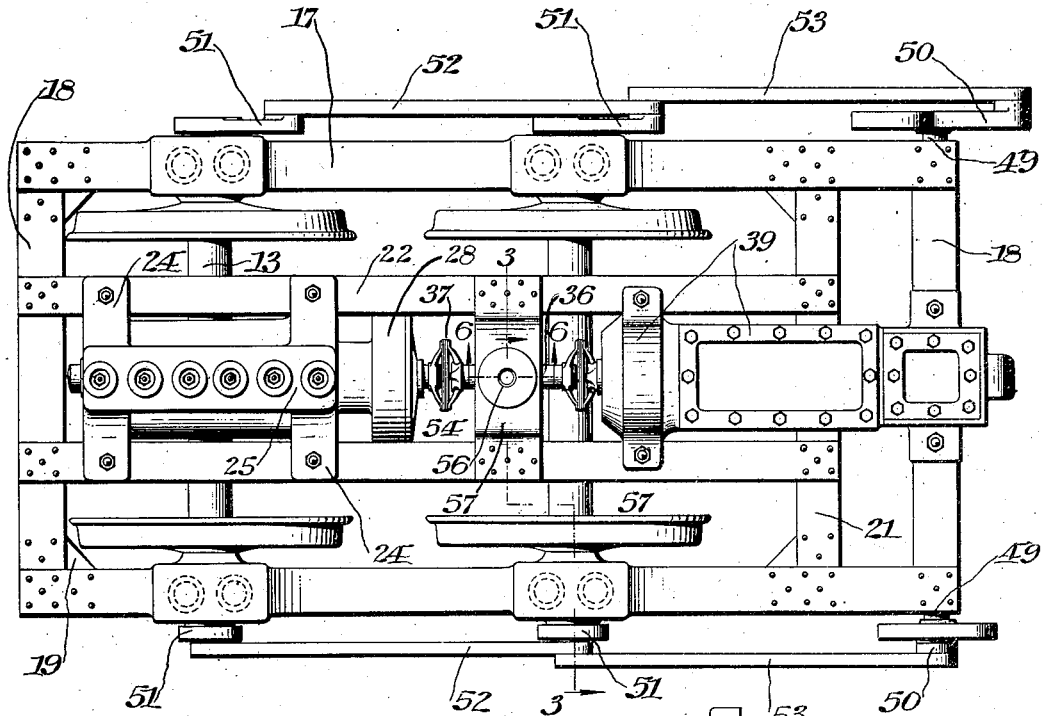
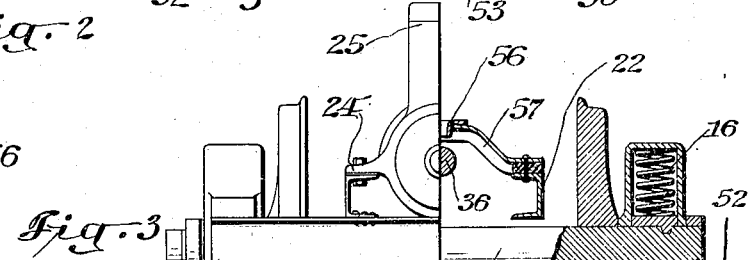
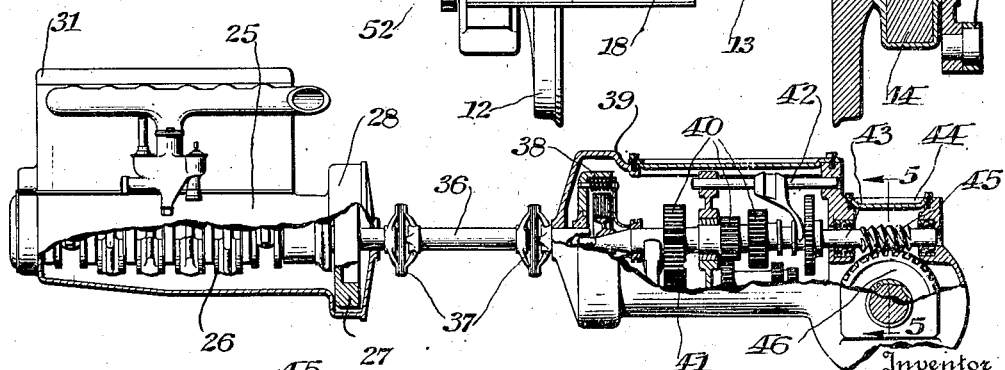
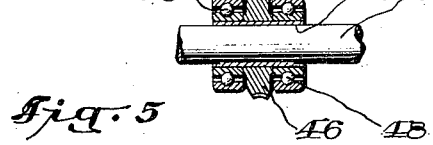
Inventor
Lionel M. Woolson
By
Attorney Patented Feb. 15, 1927.

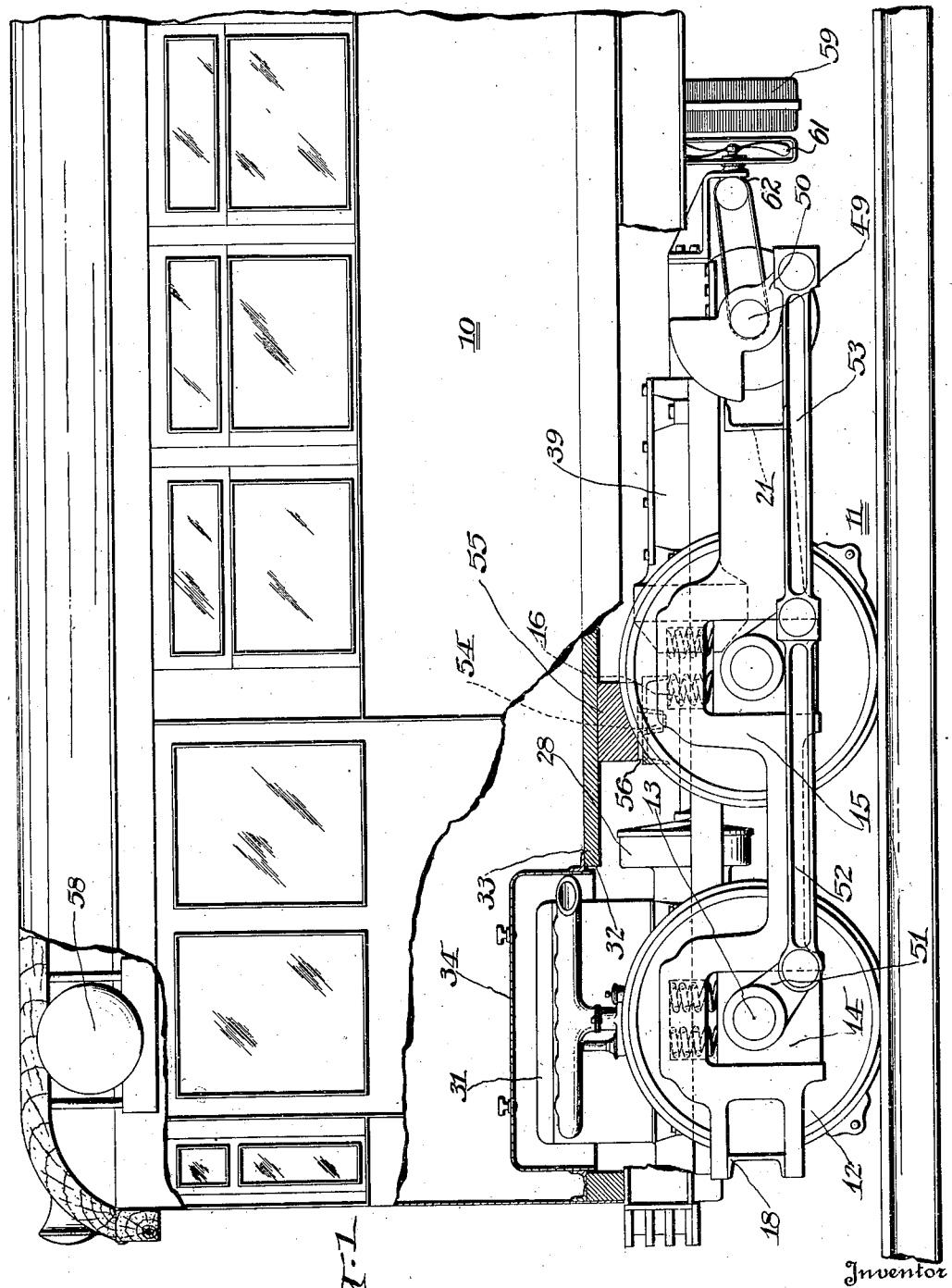

1,617,471

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed August 11, 1923. Serial No. 656,866.

This invention relates to motor vehicles, more particularly to the type which is adapted to run on rails, and it has for an object to provide such a vehicle in which the propelling mechanism shall be simple in construction, efficient and reliable, and in which accessibility shall be a major feature.

Another object of the invention is to provide a flexible transmission connecting the motor with the driving wheels of such a vehicle.

Other objects and structural features of the invention will appear from the following description taken in connection with the drawing which forms a part of this specification, and in which:

Fig. 1 is a side elevation, partially broken away and partially in section, of the motor end of a vehicle equipped with this invention;

Fig. 2 is a plan view of the drive truck shown in Fig. 1;

Fig. 3 is a vertical section on the line 3—3 of Fig. 2;

Fig. 4 is a more or less schematic representation of the preferred form of transmission employed in this invention;

Fig. 5 is a section on the line 5—5 of Fig. 4, and Fig. 6 is a section on the line 6—6 of Fig. 2.

Referring to the drawings, at 10 is shown the body of a vehicle, which may be of any desired construction, and which is supported on suitable trucks 11. The truck 11 may be of any well known construction, but, as illustrated, it comprises a four wheel, or two axle unit of a design well known in the art to which this invention relates. It is to be understood that each end of the vehicle may be supported on a drive truck similar to that illustrated in the drawings, or that one end of the vehicle may be supported on an idler truck of any desired construction.

The truck 11 comprises wheels 12, connected in pairs by axles 13 in the well known manner. The outer ends of the axles 13 are adapted to receive the usual journal boxes 14 on which the vehicle is supported. These journal boxes are mounted in a truck frame 15, suitable springs 16 being interposed between the axle boxes 14 and the frame. The frame 15 comprises side members 17 and cooperating cross members 18, rigidly secured together and reinforced by suitable braces 19, such as gusset plates. The side members 17 of the truck frame 15 extend beyond the innermost wheels of the truck and are provided, intermediate their inner ends and the inside cross member 18, with an additional cross member 21. Suitably mounted between the outside cross member 18 and the cross member 21 is a sub-frame 22, adapted to support the motor and transmission mechanism for the vehicle, and to which the vehicle body is pivoted.

The vehicle is adapted for propulsion by an internal combustion engine 25, which may be supported on the sub-frame 22 at the end of a truck in any suitable manner, as by the arms 24, preferably integral with the engine base. This motor 25 may be of any suitable type. As illustrated, it comprises an internal combustion engine of the six-cylinder-in-line type, operating on the four stroke cycle, and is provided with a detachable head. It has the usual crank shaft 26, connected at one end to a suitable fly wheel 27, mounted in a housing 28 which is integral with the motor casing. The head 31, of the motor 25 projects upwardly through an opening 32 in the vehicle floor 33. In this way access is conveniently had to the upper portion of the motor for the performance of certain repairs and adjustments, such as the cleaning of carbon from the motor, the grinding of valves, etc. The control elements, (not shown) for the motor and the vehicle, which are operated from a cab in the forward end thereof, also pass through the opening 32, which opening 32 may be closed by a suitable cover 34, preferably of sheet metal. The motor is preferably located on the sub-frame 22 near the forward end thereof, in a position substantially over the leading axle 13. In this way the motor weight is directly transmitted to the journal boxes and vibration and other stresses are not taken by the frame.

A propeller shaft 36, connected to and driven from the fly wheel 27 through suitable flexible couplings 37, is connected to the driving element of a clutch 38, mounted in a casing 39, supported on the sub-frame. The casing 39 also houses suitable transmission gearing 40, and reversing gearing 41, of usual construction. The transmission gearing 40 is connected to and operated from the driven element of the clutch 38, and the reversing gearing 41 is interposed between the clutch and the transmission gearing so that the full range of speed changes, in either direction, may be secured. The transmission gearing 40 is provided with shifting or changing apparatus of any preferred type, shown as comprising shifter rods 42, which are adapted to be controlled from the cab of the vehicle through any appropriate connections (not shown), and the reversing gearing 41 is similarly controlled.

The driven shaft 43 of the transmission gearing is journaled in appropriate bearings in a casing 44, integral with or rigidly secured to the end of the housing 39. The shaft 43 carries a worm 45, located between the bearings, which is adapted to mesh with and drive a worm wheel 46, in a well known manner. The worm wheel 46 is mounted on a sleeve 47, supported in suitable bearings 48, carried from the end frame member 18. The sleeve 48 is mounted to surround and is splined to a jack shaft 49 which extends laterally of the truck 11 and is mounted in suitable bearings thereon in the plane of the axles 13. The ends of the jack shaft 49 are equipped with counterweighted cranks 50, arranged in right angular or quartering relation. The ends of the axles 13 are similarly provided with quartering cranks 51, connected by suitable side rods 52, and the cranks 50 are connected to the nearer of the cranks 51 on each side of the vehicle by rods 53. In this manner the rotation of the jack shaft 49 is communicated to the axles 13 and to the driving wheels 12 thereon to propel the vehicle.

The body of the vehicle is pivotally supported on the truck 11 in any suitable manner in accordance with the usual practice. As shown, this supporting means for the body comprises a king pin or pivot 54, secured to the body frame member 55 and journaled in an appropriate bushing 56 held in an arched yoke member 57, which is rigidly secured to the sub-frame 22. In this manner the propeller shaft 36 is permitted to pass directly beneath the point of pivotal support, and is not disturbed in any way by the swinging of the truck in negotiating curves.

It is evident that the truck 11 may be removed for inspection, or repairs to the motor or any portion of the transmission, by jacking the vehicle body up sufficiently to withdraw the pivot pin 54 from the bushing 56 and run the truck out from under the vehicle. At the same time minor repairs and adjustments to the motor may be effected through the opening 32 in the vehicle floor, first removing the cover 34, so that all portions of the driving mechanism of the vehicle are accessible.

Fuel for the motor may be carried in any suitable receptacle, such as a tank 58, which may be placed in any convenient position on the vehicle body. As shown, it is mounted under the roof thereof, and the fuel may be conducted to the motor through the usual piping (not shown).

Appropriate cooling means is also provided for the motor, such means being of any well known construction. As shown, it comprises a radiator 59, which may be mounted in any position on the vehicle body where it is exposed to the draught of air caused by motion in either direction. Preferably it is suspended beneath the vehicle floor. The radiator 59 is connected, by means of suitable conduits (not shown) with the usual cooling jackets which surround the motor cylinders, constituting a cooling system through which water is circulated to dissipate the engine heat in a manner well understood in this art. The cooling system also includes a suitable draught fan 61, mounted in position to assist the flow of air through the radiator 59. The fan 61 may be driven in the well known manner through gearing 62, belt connected to the jack shaft 49.

It will be seen that this invention provides a simple, reliable and accessible motor vehicle which may be run with equal facility in either direction at any speed within its range, and in which the various driving elements are conveniently arranged. It will also be noted that by supporting the motor and all the various transmission units on a single frame work, a strong and rigid mounting is secured, by which the alinement of the parts is maintained.

It will be understood that various forms of the invention other than those described above may be used without departing from the spirit or scope of the invention.

What is claimed is:

1. The combination with a motor vehicle having a body mounted on trucks, of a frame on one of said trucks below the body, an internal combustion engine mounted on the frame, change speed gearing carried by the frame, reversing gearing connecting the change speed gearing to the engine, and means including worm gearing connecting the change speed gearing to the truck to propel said truck.

2. The combination with a motor vehicle having a body mounted on trucks, of a frame on one of said trucks below the body, an internal combustion engine on the frame, change speed gearing on the frame spaced from said engine, a jack shaft actuated from said change speed gearing, means including cranks operatively connecting the jack shaft to the truck, and means comprising a clutch and reversing gearing connecting the engine to the change speed gearing.

3. The combination with a motor vehicle having a body mounted on trucks comprising pairs of wheels rigidly connected by axles journaled on a frame, of a sub-frame secured to said frame and supporting an internal combustion engine and a housing, change speed, worm and reversing gearing in said housing, said change speed gearing driving the worm gearing and driven through the reversing gearing, a clutch in the housing connecting the engine to said reversing gearing, and means including a jack shaft connecting the wheels to said worm gearing.

4. The combination with a motor vehicle having a driving truck including pairs of wheels rigidly connected by axles, of a jack shaft in the horizontal plane of the axles, cranks on the ends of the jack shaft adapted to drive the wheels, an internal combustion engine supported by the truck, associated change speed and worm gearing adapted to drive the jack shaft, and means including a clutch and reversing gearing connecting the engine to the change speed gearing.

5. The combination with a motor vehicle having a body mounted on trucks, each of said trucks comprising pairs of wheels connected by axles and journaled in a frame, of a sub-frame secured to said truck frame and projecting therefrom towards the center of the vehicle, an internal combustion engine mounted on the sub-frame, a jack shaft journaled on the truck in the plane of the axles, counterweighted cranks on the ends of the jack shaft, cranks on the wheels, rods connecting said wheel cranks to said jack shaft cranks, and means on the sub-frame including gearing adapted to drive the jack shaft from the engine.

6. The combination with a motor vehicle having trucks comprising wheels and axles journaled in a frame, of a sub-frame secured to the truck frame and supporting an internal combustion engine and a housing, gearing in said housing, a clutch connecting said gearing to the engine, a jack shaft journaled on the truck in the plane of the axles and provided with cranks at its ends adapted to be driven by said gearing and means operatively connecting the jack shaft cranks to the wheels.

7. The combination of a motor vehicle having trucks each comprising wheels and axles journaled in a main frame, of a sub-frame mounted above one main truck frame, an internal combustion engine mounted on the sub-frame and extending upwardly into the vehicle body, a jack shaft journaled on the main frame adjacent one end thereof and provided with cranks, means for connecting said engine with the jack shaft to drive the same, and means connecting the jack shaft cranks with the wheel axles.

8. The combination of a motor vehicle having trucks comprising wheels and axles, and a body mounted thereon, of a sub-frame secured to one truck frame and supporting an internal combustion engine adapted to drive the truck, means including a longitudinally disposed driving shaft to connect said engine with the truck wheels, and means including a yoke on the sub-frame for pivotally supporting the body on the truck to clear the drive shaft.

9. The combination with a motor vehicle having a body pivotally mounted for oscillation in a longitudinal plane on trucks each comprising wheels, axles and a main frame, of a sub-frame secured on one main frame above the axles thereof, an internal combustion engine mounted on the sub-frame below the body and projecting thereinto, means supported on the frames to drive the wheels including gearing and a driving shaft, and a jack shaft operatively connected with said driving means and journaled on the main frame in the plane of said axles.

10. The combination with a motor vehicle of a driving truck comprising wheels connected by axles journaled in a frame, a sub-frame rigidly secured to the truck frame, a jack shaft journaled on the truck parallel to the truck axles and in the plane thereof, cranks at the ends of the jack shaft, cranks on the ends of the axles, rods connecting said cranks, and means for driving the jack shaft including gearing supported by the sub-frame and an internal combustion engine adapted to drive said gearing.

11. The combination with a motor vehicle having a driving truck and a body, of a subframe attached to the truck frame, an internal combustion engine mounted on the sub-frame and projecting upwardly into the body, and pivotal means connecting the sub-frame and the body.

12. The combination with a motor vehicle having a body supported at one end by a driving truck, of a floor for the body, a sub-frame secured to the truck frame, an internal combustion engine supported on the sub-frame and extending upwardly through the floor of the body, means detachably securing the body to the sub-frame in pivotal relation, and means connecting the engine to drive the truck whereby said truck constitutes an independent detachable power unit for the motor vehicle.

13. The combination with a motor vehicle having a body, of trucks comprising a frame and a sub-frame secured thereto, an engine on the sub-frame, a horizontally disposed drive shaft connected to the engine, and means disposed above the drive shaft carried by the sub-frame pivotally connecting the body to the truck.

14. The combination with a motor vehicle having trucks, of an internal combustion engine, means connecting the engine to the trucks in driving relation including a jack shaft and change speed gearing between the jack shaft and the engine, and means for cooling said engine including a fan operatively connected to the jack shaft.

In testimony whereof I affix my signature.

LIONEL M. WOOLSON.